United States Patent
Kuo

(10) Patent No.: US 10,223,769 B2
(45) Date of Patent: Mar. 5, 2019

(54) DISPLAY DEVICE AND EXTENDED DISPLAY IDENTIFICATION DATA REPLACEMENT METHOD THEREOF

(71) Applicants: Qisda (Suzhou) Co., Ltd., Suzhou, Jiangsu (CN); Qisda Corporation, Taoyuan (TW)

(72) Inventor: Chia-Hsiung Kuo, Taoyuan (TW)

(73) Assignees: Qisda (Suzhou) Co., Ltd., Suzhou (CN); Qisda Corporation, Taoyuan (TW)

( * ) Notice: Subject to any disclaimer, the term of this patent is extended or adjusted under 35 U.S.C. 154(b) by 0 days.

(21) Appl. No.: 15/461,479

(22) Filed: Mar. 17, 2017

(65) Prior Publication Data
US 2017/0270638 A1    Sep. 21, 2017

(30) Foreign Application Priority Data
Mar. 18, 2016 (CN) .......................... 2016 1 0156709

(51) Int. Cl.
    *G06T 3/40*     (2006.01)
(52) U.S. Cl.
    CPC .............. *G06T 3/4092* (2013.01); *G06T 3/40* (2013.01)
(58) Field of Classification Search
None
See application file for complete search history.

(56) References Cited

U.S. PATENT DOCUMENTS

| | | | |
|---|---|---|---|
| 8,069,276 B2 | 11/2011 | Kang et al. | |
| 2012/0038655 A1 | 2/2012 | Kang et al. | |
| 2014/0018645 A1* | 1/2014 | Wada | A61B 5/0095 600/316 |
| 2014/0193134 A1* | 7/2014 | Maeda | G11B 20/10009 386/231 |
| 2016/0035313 A1* | 2/2016 | Zhang | H04N 5/268 348/474 |

FOREIGN PATENT DOCUMENTS

CN      101727264      6/2010

* cited by examiner

*Primary Examiner* — Michelle Chin

(57) ABSTRACT

A display device includes a first storage unit and a display chip. The first storage unit stores first extended display identification data comprising a plurality of first preset parameters. The display chip includes a control unit. The control unit provides at least one second preset parameter to replace a part of the first preset parameters in the first extended display identification data in response to a control signal and thereby generate second extended display identification data. The display chip issues a notification signal to notify the display signal providing device to read the second extended display identification data in response to a generation of the second extended display identification data. The display signal providing device provides a first display signal compatible with the second extended display identification data to the display device after reading the second extended display identification data. An extended display identification data replacement method is also provided.

16 Claims, 5 Drawing Sheets

DISPLAY DEVICE AND EXTENDED DISPLAY IDENTIFICATION DATA REPLACEMENT METHOD THEREOF

FIELD OF THE INVENTION

The present invention relates to a display device, and more particularly to a display device capable of converting extended display identification data (EDID) and an extended display identification data replacement method of the display device.

BACKGROUND OF THE INVENTION

Extended display identification data is stored in an internal storage element of a display device and is used to describe various parameters of the display capability of the display device. In general, the extended display identification data includes basic information and display parameters, such as manufacturer, serial number, clock and resolution of the display device. When a signal source such as a computer host or a game console is connected to the display device, the extended display identification data is first read so as to avoid the outputted display signal exceeding the display capacity of the display device. However, for various signal sources such as different hosts or different display cards, a single extended display identification data would be unable to meet the display requirements of different signal sources. Therefore, it is necessary to think about how to process the extended display identification data so that the data meet the needs of the corresponding signal source.

SUMMARY OF THE INVENTION

One objective of the present invention is to provide a display device that is different from the prior art.

Another objective of the present invention is to provide an extended display identification data replacement method adapted to be used for the aforementioned display device.

The present invention provides a display device adapted to receive a display signal provided by a display signal providing device. The display device includes a first storage unit and a display chip. The first storage unit is configured to store first extended display identification data comprising a plurality of first preset parameters. The display chip includes a control unit. The control unit is configured to provide at least one second preset parameter to replace a part of the first preset parameters in the first extended display identification data in response to a control signal and thereby generate second extended display identification data. The display chip issues a notification signal to notify the display signal providing device to read the second extended display identification data in response to a generation of the second extended display identification data. The display signal providing device provides a first display signal compatible with the second extended display identification data to the display chip after reading the second extended display identification data.

The present invention further provides an extended display identification data replacement method adapted to be used between the aforementioned display device and the display signal providing device. The extended display identification data replacement method includes: reading the first extended display identification data comprising the plurality of first preset parameters; configuring the control unit to provide at least one second preset parameter to replace a part of the first preset parameters in the first extended display identification data according to a control signal and thereby generate second extended display identification data; and issuing a notification signal to notify the display signal providing device to read the second extended display identification data. After reading the second extended display identification data, the display signal providing device is configured to provide a first display signal compatible with the second extended display identification data to the display device.

In summary, in the display device of the present invention, the control unit provides at least one second preset parameter to replace a part of the first preset parameter in the first extended display identification data. Therefore, the display device can have display capability corresponding to the display signal providing device by replacing only a part of the first preset parameters in response to the requirement of the display signal providing device without having to replace all of the first preset parameters.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
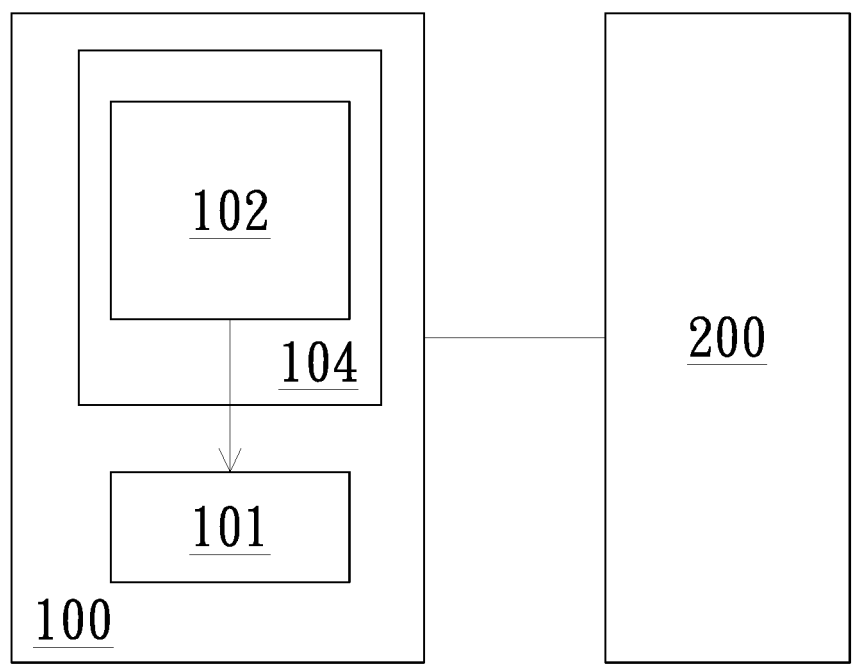
FIG. 1 is a block diagram of a display device in accordance with an embodiment of the present invention.

FIG. 1 is a block diagram of a display device in accordance with an embodiment of the present invention. As shown in FIG. 1, the display device 100 of the present embodiment is connected to a display signal providing device 200. The display signal providing device 200 is configured to read extended display identification data (EDID) from the display device 100 and provide a display signal to the display device 100. The display device 100 is, for example, liquid crystals display (LCD) or light emitting diode (LED) display. The display signal providing device 200 is, for example, a host computer or a game console. The display device 100 includes a storage unit 101 and a display chip 104. The storage unit 101 is configured to store first extended display identification containing a plurality of first preset parameters.

In the present embodiment, the display signal providing device 200 may include two display cards (not shown) having different functions; that is, the two display cards each have a specific graphic processing capability. For example, one of the display cards has the capability of supporting 3D video signal processing, while the other display card has the capability of supporting intelligent vertical synchronization (Adaptive Sync). Thus, the display signal providing device 200 can use one of the two display cards to send a specific display signal to the display device 100 in response to a specific display requirement. Correspondingly, the display device 100 must provide the corresponding extended display identification data to the display signal providing device 200 so as to notify the display signal providing device 200 to start providing the corresponding display signal. Specifically, when switched on, the display signal providing device 200 reads the first extended display identification data of the display device 100 and transmits a general display signal. Then, when the display signal providing device 200 enables one of the two display cards to activate a specific display function (e.g., 3D or Adaptive Sync), the display signal changes correspondingly. Meanwhile the display device 100 automatically detects the auxiliary information in the display signal to determine whether to convert the current first extended display identification data so that the display device 100 can display in accordance with the specific requirement of the display signal providing device 200. It is understood that the user may manually set the extended display identification data of the display device 100 so that the display device 100 can perform a displaying in accordance with the specific requirement of the display signal providing device 200. More detail will be described below.

Please continue to refer to FIG. 1. The display chip 104 in the display device 100 is configured to receive and process the display signal provided by the display signal providing device 200. The display chip 104 includes a control unit 102, which is configured to provide at least one second preset parameter to replace a part of the first preset parameters in the first extended display identification data according to a control signal and thereby generate second extended display identification data. In other words, the control unit 102 converts the first extended display identification data into the second extended display identification data in response to the received control signal. Then, the display chip 104 issues a notification signal to notify the display signal providing device 200 to read the second extended display identification data in response to the generation of the second extended display identification data. After reading the second extended display identification data, the display signal providing device 200 provides the display chip 104 with a display signal compatible with the second extended display identification data. It is to be noted that the control unit 102 may also provide at least one third preset parameter to replace a part of the first preset parameters in the first extended display identification data and thereby generate third extended display identification data, in response to more than two display functions.

Figure 2:
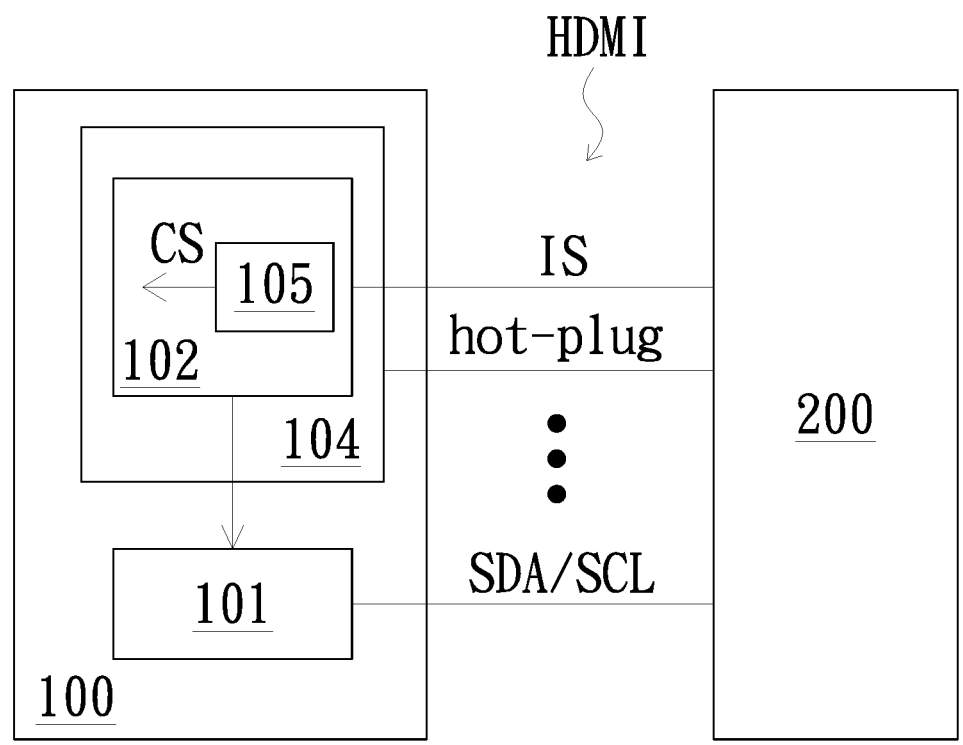
FIG. 2 is a block diagram of a display device in accordance with another embodiment of the present invention.

FIG. 2 is a block diagram of a display device in accordance with another embodiment of the present invention. The same reference numerals in FIGS. 2 and 1 denote the same elements or signals. As shown in FIG. 2, the difference from FIG. 1 is that the control unit 102 in the present embodiment includes a detection unit 105. The detection unit 105 is configured to detect the auxiliary information (e.g., InfoFrame) in the display signal IS provided by the display signal providing device 200 and determine whether to issue the control signal CS to the control unit 102 according to the auxiliary information. In the present embodiment, the display device 100 and the display signal providing device 200 are electrically connected via a high-definition multimedia interface HDMI. Specifically, the display signal providing device 200 reads the first extended display identification data and the second extended display identification data from the display device 100 via the data line SDA and the clock line SLC of the high-definition multimedia interface HDMI. In particular, the display device 100 supports hot-plugging and is electrically connected to the display signal providing device 200, so that when the control unit 102 successfully replaces a part of the first preset parameters with at least one second preset parameter, the display chip 104 would immediately issue the notification signal to the display signal providing device 200 so as to notify the display signal providing device 200 to re-read the second extended display identification data. In the present embodiment, the storage unit 101 is implemented by non-volatile memory such as programmable read-only memory (PROM) or electronically erasable rewritable read-only memory (EEPROM); however, the aforementioned implementations are used for exemplary purposes only and the present invention is not limited thereto.

Figure 3:
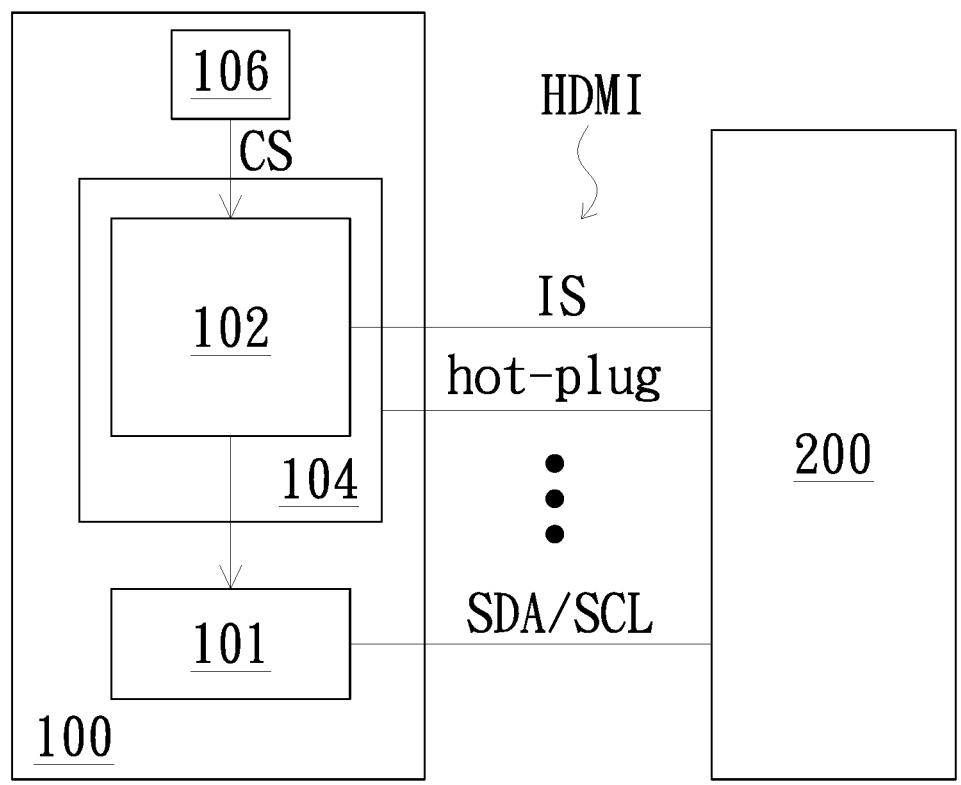
FIG. 3 is a block diagram of a display device in accordance with still another embodiment of the present invention.

FIG. 3 is a block diagram of a display device in accordance with still another embodiment of the present invention. The same reference numerals in FIGS. 3 and 2 denote the same elements or signals. As shown in FIG. 3, the difference from FIG. 2 is that the display device 100 of the present embodiment does not employ the detection unit 105 but employs a user interface 106. The user interface 106 is configured to allow the user to optionally send a corresponding control signal CS to the control unit 102 so that the control unit 102 provides at least one corresponding second preset parameter to replace a part of the first preset parameters. In the present embodiment, the user interface 106 may provide specific options for the user to operate. For example, the user interface 106 may have a menu allowing the user to select 3D or Adaptive Sync; wherein the first extended display identification data corresponds to 3D display function and the second extended display identification data corresponds to Adaptive Sync display function. Therefore, when the storage unit 101 originally stores the first extended display identification data but the user desires to switch to Adaptive Sync, the user may select Adaptive Sync via the user interface 106, and correspondingly the control unit 102 provides at least one second preset parameter to replace a part of the first preset parameters in the first extended display identification data according to a control signal CS (generated by the user interface 106) and thereby generate the second extended display identification data. Alternatively, when the storage unit 101 originally stores the second extended display identification data but the user desires to switch to 3D display function, the user may select 3D via the user interface 106, and correspondingly the control unit 102 provides at least one first preset parameter to replace a part of the second preset parameters in the second extended display identification data according to a control signal CS (generated by the user interface 106) and thereby generate the first extended display identification data.

In an additional application of the present invention, the user interface 106 may provide a resolution adjustment menu for elderly users. For example, by selecting a low-resolution image function, an elderly user can have a better viewing experience for that enlarged graphics and texts are displayed in an elderly use mode. In other words, the elderly user may select the elderly use mode (low-resolution imaging function) via the resolution adjustment menu on the user interface 106, and correspondingly the user interface 106 issues a corresponding control signal CS to the control unit 102 so as to configure the control unit 102 to provide at least one second preset parameter to replace a part of the first preset parameters and thereby generate the second extended display identification data containing the information of the low-resolution imaging function. Then, the display chip 104 issues the notification signal to notify the display signal providing device 200 to read the second extended display identification data. After reading the second extended display identification data, the display signal providing device 200 provides the display signal IS with low resolution to the display device 100. In other words, the user can change the resolution of the display image without having to use the display signal providing device 200 as in the prior art.

Figure 4:
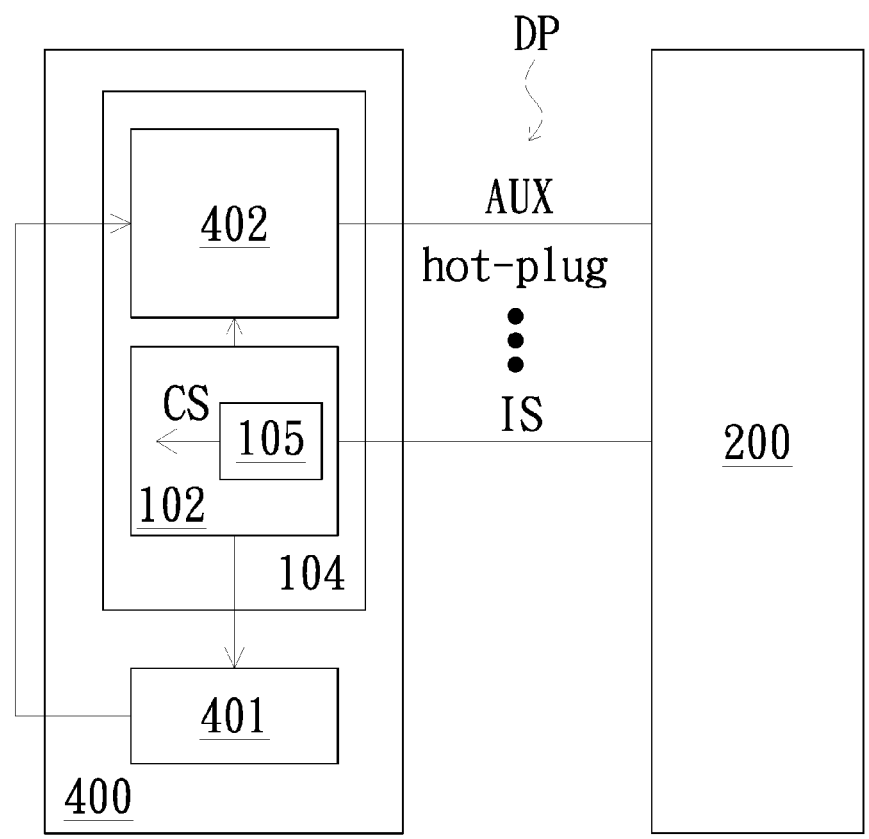
FIG. 4 is a block diagram of a display device in accordance with yet another embodiment of the present invention.

FIG. 4 is a block diagram of a display device in accordance with yet another embodiment of the present invention. The same reference numerals in FIGS. 4 and 2 denote the same elements or signals. As shown in FIG. 4, the difference from FIG. 2 is that the display device 400 in the present embodiment and the display signal providing device 200 are electrically connected via a display port DP. Specifically, the display signal providing device 200 reads the first extended display identification data and the second extended display identification data via the auxiliary channel AUX in the display port DP. In addition, when switched on, the control unit 102 is configured to store the first extended display identification data that includes a plurality of first preset parameters and stored in the storage unit 401 into the storage unit 402. The control unit 102 then provides at least one second preset parameter to replace a part of the first preset parameters stored in the storage unit 402 according to a control signal CS and thereby generate the second extended display identification data. In summary, the display signal providing device 200 reads the first extended display identification data or the second extended display identification data from the storage unit 402 via the auxiliary channel AUX in the display port DP.

In the present embodiment, the storage unit 401 is implemented by non-volatile memory such as programmable read-only memory or electronically erasable rewritable read-only memory; and the storage unit 402 is implemented by a volatile memory such as dynamic random access memory (DRAM). In addition, although the present embodiment is exemplified by configuring the detection unit 105 to provide the control signal CS so that the control unit 102 provides at least one second preset parameter to replace a part of the first preset parameters, in another embodiment the user interface may be used to allow the user to issue a corresponding control signal CS to the control unit 102 in a manual manner as described above, and no redundant detail is to be given herein. In the present embodiment, although the storage unit 402 is provided in the display chip 104, the present invention is not limited thereto; that is, the storage unit 402 may be provided outside the display chip 104 in another embodiment.

Figure 5:
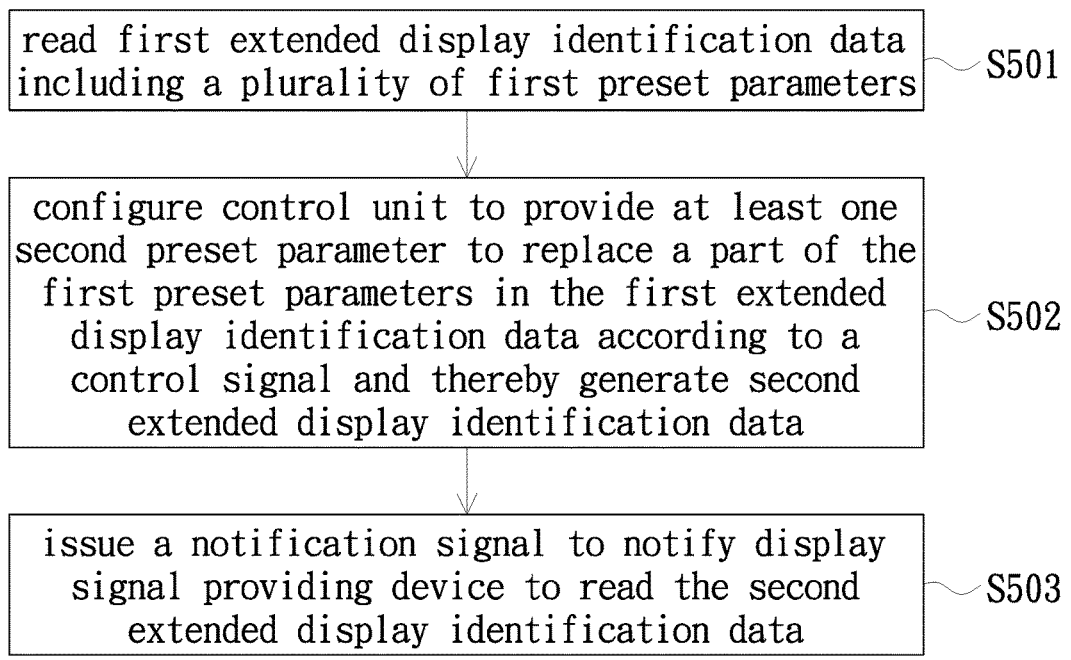
FIG. 5 is a flowchart of an extended display identification data replacement method in accordance with an embodiment of the present invention.

FIG. 5 is a flowchart of an extended display identification data replacement method in accordance with an embodiment of the present invention, which is applied between a display device and a display information providing device. The display device includes a first storage unit and a control unit. The first storage unit is configured to store first extended display identification data including a plurality of first preset parameters. The extended display identification data replacement method includes steps S501 to S503. First, step S501: reading the first extended display identification data including a plurality of first preset parameters. Thereafter, step S502: configuring the control unit to provide at least one second preset parameter to replace a part of the first preset parameters in the first extended display identification data according to a control signal and thereby generate second extended display identification data. Thereafter, step S503: issuing a notification signal to notify the display signal providing device to read the second extended display identification data. In the present embodiment, after reading the second extended display identification data, the display signal providing device provides a display signal compatible with the second extended display identification data to the display device.

In summary, in the present invention, a control unit provides at least one second preset parameter to replace a part of the first preset parameter, thereby convert first extended display identification data into second extended display identification data and notifies a display signal providing device to read the second extended display identification data. Further, after reading the second extended display identification data, the display signal providing device provides a display signal compatible with the second extended display identification data to the display device. As a result, the display device can perform a displaying compatible with the display signal.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display device for receiving a display signal provided by a display signal providing device, the display device comprising:
   only one storage unit, wherein first extended display identification data comprising a plurality of first preset parameters are only stored in the storage unit; and
   a display chip, comprising a control unit, wherein the control unit is for providing at least one second preset parameter to replace only a part of the first preset parameters in the first extended display identification data in response to a control signal and thereby generating second extended display identification data,
   wherein the display chip issues a notification signal to notify the display signal providing device to read the second extended display identification data in response to a generation of the second extended display identification data, and the display signal providing device provides a first display signal compatible with the second extended display identification data to the display chip after reading the second extended display identification data.

2. The display device according to claim 1, wherein the display chip further comprises a detection unit for detecting auxiliary information in a second display signal provided by the display signal providing device and determine whether to issue the control signal to the control unit according to the auxiliary information.

3. The display device according to claim 1, further comprising a user interface for allowing a user to optionally send the control signal to the control unit so as to configure the control unit to provide the at least one second preset parameter to replace the part of the first preset parameters.

4. The display device according to claim 3, wherein the user interface is further for providing a resolution adjustment menu for the user to enter the control signal so as to configure the control unit to provide the at least one second preset parameter to replace the part of the first preset parameters in the first extended display identification data and thereby generate the second extended display identification data, the at least one second preset parameter corresponds to resolution information, wherein the display chip issues the notification signal to notify the display signal providing device to read the second extended display identification data in response to the generation of the second extended display identification data, and the display signal providing device provides the first display signal compatible with the resolution information to the display chip after reading the second extended display identification data.

5. The display device according to claim 4, wherein the resolution information is for informing the display signal providing device to reduce a resolution of the first display signal so as to increase a size of an image displayed by the display device.

6. The display device according to claim 1, wherein the display device and the display signal providing device are electrically connected via a high-definition multimedia interface, and the display signal providing device reads the first extended display identification data and the second extended display identification data via a data line and a clock line of the high-definition multimedia interface.

7. The display device according to claim 1, wherein the display device and the display signal providing device are electrically connected via a display port, and the display signal providing device reads the first extended display identification data and the second extended display identification data via an auxiliary channel of the display port.

8. The display device according to claim 1, wherein the display device supports hot-plugging and is electrically connected to the display signal providing device, wherein when the control unit successfully uses the at least one second preset parameter to replace a part of the first preset parameters, the display chip issues the notification signal to the display signal providing device so as to notify the display signal providing device to re-read the second extended display identification data.

9. An extended display identification data replacement method to be used between a display device and a display signal providing device, the display device comprising only one storage unit and a control unit, wherein first extended display identification data comprising a plurality of first preset parameters are only stored in the storage unit, and the extended display identification data replacement method comprising:
   reading the first extended display identification data comprising the plurality of first preset parameters;
   configuring the control unit to provide at least one second preset parameter to replace only a part of the first preset parameters in the first extended display identification data according to a control signal and thereby generating second extended display identification data; and
   issuing a notification signal to notify the display signal providing device to read the second extended display identification data,
   wherein after reading the second extended display identification data, the display signal providing device provides a first display signal compatible with the second extended display identification data to the display device.

10. The extended display identification data replacement method according to claim 9, wherein the display device further comprises a detection unit for detecting auxiliary information in a second display signal provided by the display signal providing device and determine whether to issue the control signal to the control unit according to the auxiliary information.

11. The extended display identification data replacement method according to claim 9, wherein the display device further comprises a user interface for allowing a user to optionally send the control signal to the control unit so as to configure the control unit to provide the at least one second preset parameter to replace the part of the first preset parameters.

12. The extended display identification data replacement method according to claim 11, wherein the user interface is further for providing a resolution adjustment menu for the user to enter the control signal so as to configure the control unit to provide the at least one second preset parameter to replace the part of the first preset parameters in the first extended display identification data and thereby generate the second extended display identification data, the at least one second preset parameter corresponds to resolution information, wherein the display chip issues the notification signal to notify the display signal providing device to read the second extended display identification data in response to the generation of the second extended display identification data, and the display signal providing device provides the first display signal compatible with the resolution information to the display chip after reading the second extended display identification data.

13. The extended display identification data replacement method according to claim 12, wherein the resolution information is for informing the display signal providing device to reduce a resolution of the first display signal so as to increase a size of an image displayed by the display device.

14. The extended display identification data replacement method according to claim 9, wherein the display device and the display signal providing device are electrically connected via a high-definition multimedia interface, and the display signal providing device reads the first extended display identification data and the second extended display identification data via a data line and a clock line of the high-definition multimedia interface.

15. The extended display identification data replacement method according to claim 9, wherein the display device and the display signal providing device are electrically connected via a display port, and the display signal providing device reads the first extended display identification data and the second extended display identification data via an auxiliary channel of the display port.

16. The extended display identification data replacement method according to claim 9, wherein the display device supports hot-plugging and is electrically connected to the display signal providing device, wherein when the control unit successfully uses the at least one second preset parameter to replace a part of the first preset parameters, the display chip issues the notification signal to the display signal providing device so as to notify the display signal providing device to re-read the second extended display identification data.

* * * * *